United States Patent
Ross et al.

(10) Patent No.: US 7,543,170 B2
(45) Date of Patent: Jun. 2, 2009

(54) EQUIPMENT FAIL SAFE SAFETY SYSTEM

(75) Inventors: Rens Ross, Austin, TX (US); Steven C. McCool, Austin, TX (US)

(73) Assignee: Novacentrix Corp., Austin, TX (US)

( * ) Notice: Subject to any disclaimer, the term of this patent is extended or adjusted under 35 U.S.C. 154(b) by 217 days.

(21) Appl. No.: 10/955,202

(22) Filed: Sep. 30, 2004

(65) Prior Publication Data

US 2006/0072251 A1   Apr. 6, 2006

(51) Int. Cl.
*G06F 1/30* (2006.01)
(52) U.S. Cl. .................. 713/340; 713/300; 714/14; 714/24
(58) Field of Classification Search .......... 713/300, 713/340; 714/24, 14
See application file for complete search history.

(56) References Cited

U.S. PATENT DOCUMENTS

| 4,663,539 | A | * | 5/1987 | Sharp et al. ............. 307/38 |
| 5,947,907 | A | * | 9/1999 | Duich ..................... 600/483 |
| 6,167,358 | A | * | 12/2000 | Othmer et al. ........... 702/188 |
| 6,735,720 | B1 | * | 5/2004 | Dunn et al. .............. 714/43 |
| 2004/0119341 | A1 | * | 6/2004 | Hickle .................... 307/66 |

FOREIGN PATENT DOCUMENTS

JP          56009833 A  *  1/1981

OTHER PUBLICATIONS

Berkshire Products, Inc., PCI PC Watchdog™, available via the Internet at .berkprod.com/pci_pc_watchdog.htm, copyright 1997-2004, pp. 1-2.

Synetic Inc., "PCI WatchDog Hardware Monitoring Adapter," available via the Internet at .synetic.net/Synetic-Products/Watch-Dog.htm, pp. 1-4.

Forthright Systems and Consulting, Inc., "PC Watchdog System," available via the Internet at .forthrt.com/homepage/watchdog/watchdog.html, pp. 1-3.

Quancom Information Systems, "Watchdog2—ISA watchdog with 2 relays for PC reset and an external device," available via the Internet at .quancom.de/quancom/quancom01.nsf/home_prod_eng.htm?OpenFrameSet&Frame=unten&Src=http://www.quancom.de/qprod01/eng/pb/watchdog2.htm, pp. 1-5.

* cited by examiner

*Primary Examiner*—Thuan N Du
(74) *Attorney, Agent, or Firm*—Dillon & Yudell LLP

(57) ABSTRACT

A system for monitoring and controlling the safety system of equipment, which is used to insure personnel safety and cause the system to "fail safe" in the event of computer or software failure, the failure of a critical piece of hardware, or the opening of any interlock indicating, for example, the unexpected entry of personnel into a dangerous area. Provides an integrated system of timed status monitoring hardware and software for use in a distributed-network computer-controlled environment. The hardware piece of this system includes a digital I/O computer add-on card, or other hardware supporting high-speed alternating state telemetry, and a custom circuit card. Such a circuit, when used within the overall control system can monitor the state of interlock switches and monitor the status of the computer control system(s). Such a safety circuit can then cause a shutdown appropriate to the failure detected. In addition, it has an ability to sense local hardware status information and immediately signal the computer of any potentially dangerous situation.

4 Claims, 5 Drawing Sheets

EQUIPMENT FAIL SAFE SAFETY SYSTEM

TECHNICAL FIELD

The present invention relates in general to systems for maintaining safe operating conditions of equipment.

BACKGROUND INFORMATION

Computers have become ubiquitous in monitoring and controlling manufacturing equipment. Very often, multiple distributed computer systems are utilized, with a need for such computers to communicate with each other. One of the primary jobs given to such distributed computer systems is to monitor the manufacturing equipment to insure that it is operating in a safe manner. Since humans have now become so reliant upon such computers monitoring the safety of their manufacturing equipment, it is imperative that such safety systems be foolproof and reliable. This is especially true with respect to electrical systems that can store large amounts of energy, thus posing significant hazards to both people and equipment. Using off the shelf commercial computer equipment and software to control these systems complicates the problem because of their inherent lack of reliability. As a result, there is a need in the art for a system to be coupled to such computer systems to insure personnel safety and cause systems to "fail safe" in the event of computer or software failure. Without such reliable safety systems, the result can be very costly from the standpoint of destroyed equipment, injuries, or loss of life.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
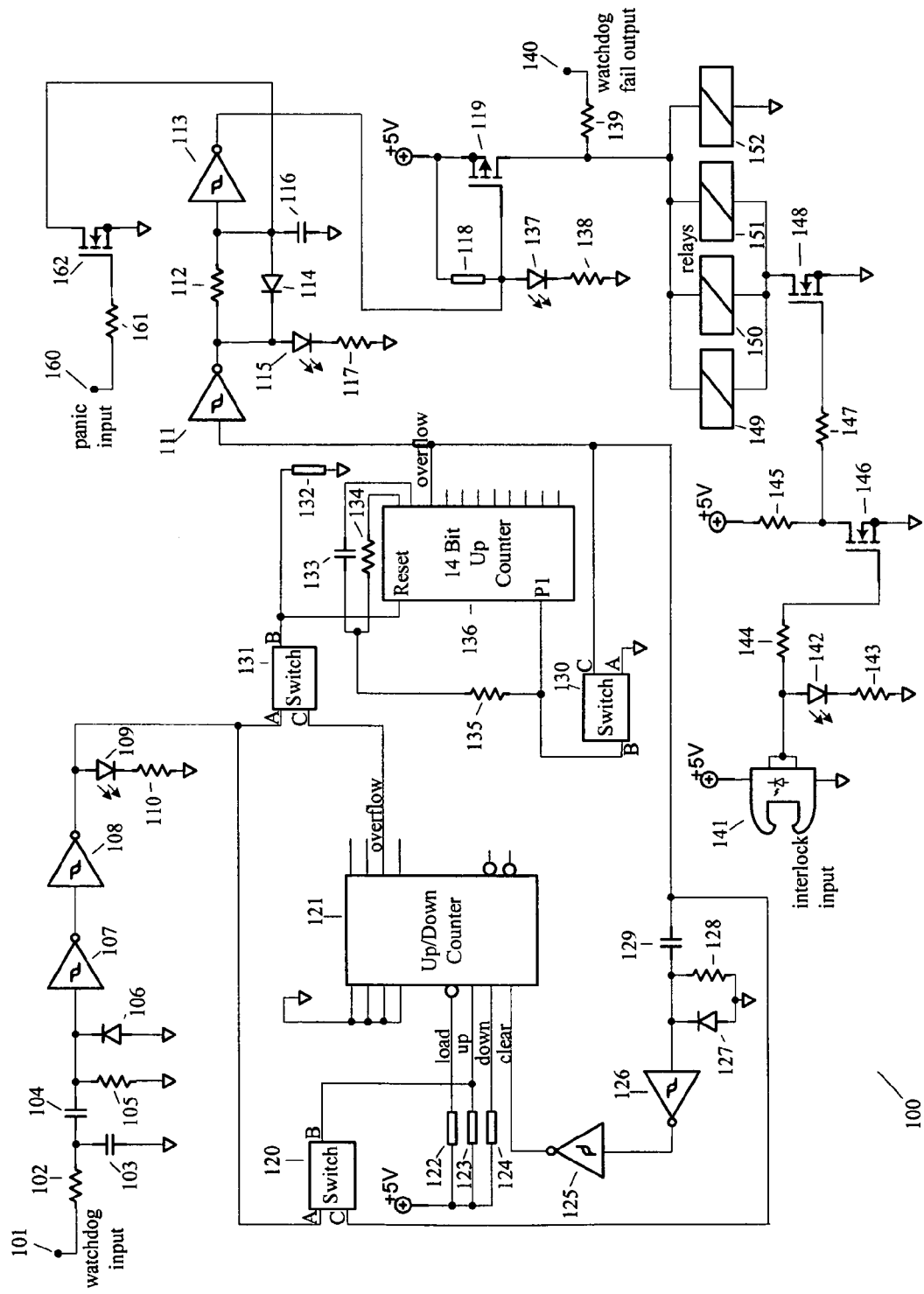
FIG. 1 illustrates circuitry for a safety system configured in accordance with an embodiment of the present invention.

In the following description, numerous specific details are set forth such as specific circuit devices, etc. to provide a thorough understanding of the present invention. However, it will be obvious to those skilled in the art that the present invention may be practiced without such specific details. For example, where TTL (transistor-transistor logic) is utilized, other well-known logic families or gate arrays could be substituted.

In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention monitors and controls the safety system of equipment, which is used to insure personnel safety and cause the system to "fail safe" in the event of computer or software failure, the failure of a critical piece of hardware, or the opening of any interlock indicating, for example, the unexpected entry of personnel into a dangerous area. The present invention provides an integrated system of timed status monitoring hardware and software for use in a distributed-network computer-controlled environment. The hardware piece of this system includes a digital I/O computer add-on card, or other means of monitoring software activity as discussed below. The hardware also includes a custom circuit card referred to herein as the watchdog safety card, or circuit. Such a circuit, when used within the overall control system (See FIG. 2) can monitor the state of an interlock switch and monitor the status of the computer control system (s). Such a watchdog safety circuit can then cause a shutdown appropriate to the failure detected. In addition, the present invention has an ability to sense local hardware status information and immediately signal the computer of any potentially dangerous situation. With the system, it is also possible to adjust a time scale for sensing any loss of software performance requiring a system abort, such as in the range of 10 milliseconds to 5 seconds.

Referring to FIG. 1, there is illustrated a circuit diagram for a watchdog safety card 100, configured in accordance with an embodiment of the present invention. Circuit 100 monitors three input signals, and has five outputs. Four of the output signals are normally open relay contacts 149-152. However, any number of inputs and outputs may be handled and designed for in accordance with the principles described below. Relay contacts 149-151 may be used as relays for applying power to equipment being monitored or controlled. In this example, the three relays 149-151 provide AC power to three pieces of equipment (203a . . . 203d). Relay contact 152 may be a control power signal. This can be used to continue to power interface electronics while other electronics is shut down via relays 149-151 if, for example, a door interlock is broken. The coils of all four relays 149-152 are connected to a five-volt power supply through transistor 119, a p-channel field effect transistor (FET), used as a high side switch. The state of transistor 119 is indicated through resistor 139 by TTL watchdog fail output 140. If transistor 119 turns off, all four relays 149-152 will turn off, opening their contacts. In the case of relay 152, this directly operates the relay because its other coil connection is routed to a power supply ground potential. For relays 149-151, however, a low side switch must also be turned on in order for coil current to flow.

Transistor 148 is the low side switch that allows coil current to flow through relays 149-151. In order to turn on relays 149-151, both transistors 119 and 148 must be turned on. Transistor 148, an n-channel FET, will turn on if a lighted fiber optic signal is present at phototransistor 141. This fiber optic signal is also referred to herein as the interlock input, or signal. The interlock input signal arrives as a fiber optic input to fiber optic receiver 141. Fiber optic receiver 141 is a phototransistor with an open collector output. When the interlock fiber is lit, indicating a complete interlock circuit, the output of receiver 141 goes low. This will turn off LED (light emitting diode) 142 coupled between the output of receiver 141 and a ground potential through resistor 143. This provides a visual indication of the interlock status. Resistors 144, 145, and 147 and n-channel FET 146 form an inverter whose output drives the gate electrode of transistor 148. Thus, relays 149-151 will open should the lighted fiber signal received by receiver 141 be removed. As will be discussed further below, it should be noted that this does not cause an opening of relay 152.

Figure 2:
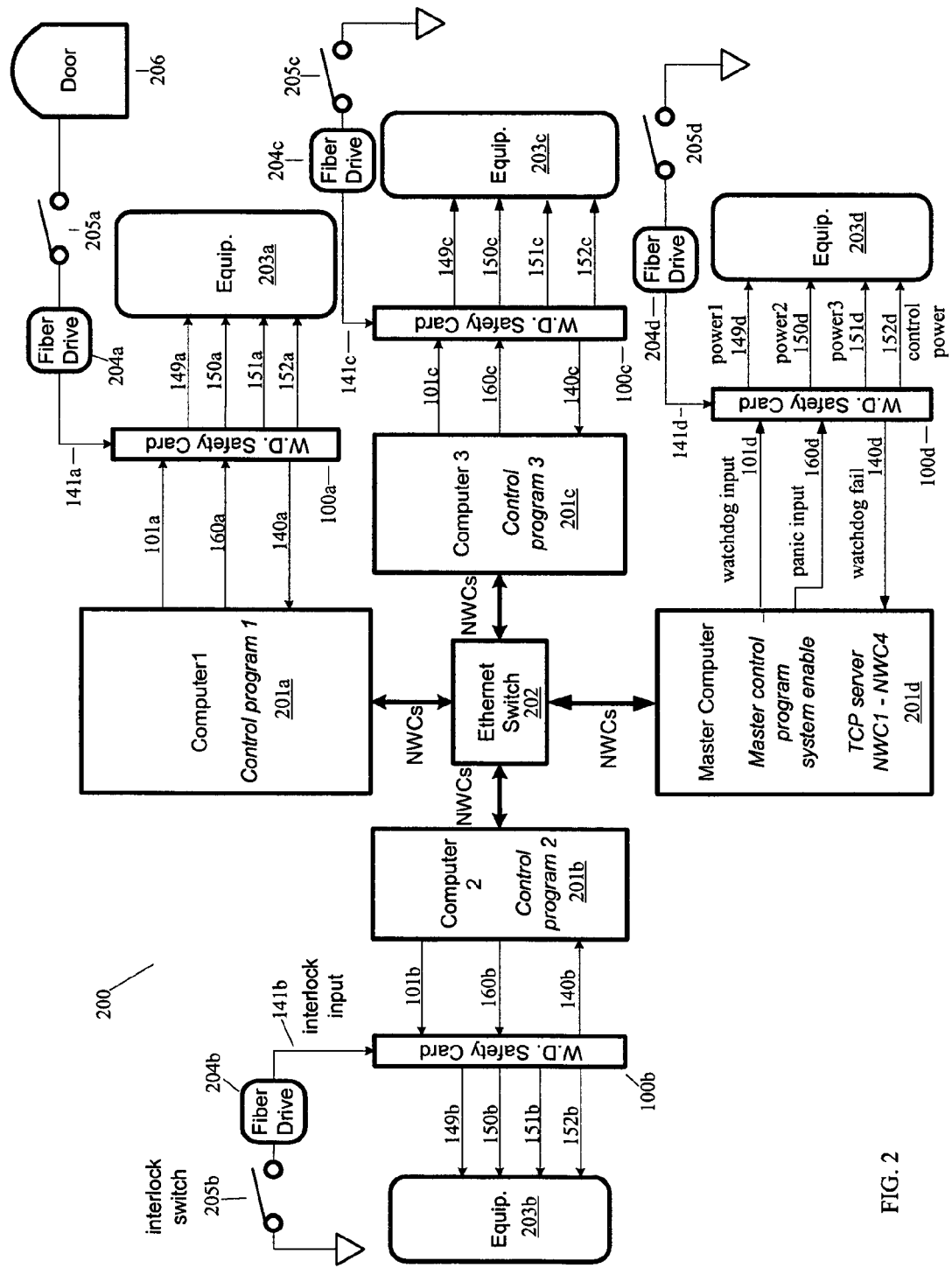
FIG. 2 illustrates a distributed computer system implementing the safety system of FIG. 1.

An edge detector circuit (devices 101-110) within circuit 100 has the function of generating a narrow, positive TTL pulse every time it detects a rising edge on pulse input 101. The signals received at input 101 should be a regular sequence of electrical pulses driven by the computer coupled to circuit 100. As will be discussed further below, FIG. 2 illustrates such computers 201a . . . 201d producing watchdog input signals 101a . . . 101d received by watchdog safety cards 100a . . . 100d. Should the time between the pulses grow too long or stop altogether, circuit 100 will consider the computer 201 to have failed. A watchdog timeout interval is the maximum allowed time between rising edges of the watchdog input, pulse, or signal, and can be set to any value, such as between one millisecond and five seconds. How such a watchdog input, or pulse, signal is produced is discussed further below with respect to FIG. 2. Resistor 102 and capacitor 103 form a low pass filter to eliminate noise spikes that may fool the edge detector circuitry. Capacitor 104 and resistor 105 form a high pass filter that detects the rising edges of the pulse input signal received at input 101. Schmidt trigger gates 107 and 108 convert the analog output of the high pass filter into a TTL signal with sharp edges. Diode 106 prevents negative voltage spikes from damaging Schmidt trigger gate 107. Tick LED 109, along with resistor 110, provides a visual indication of detected rising edges.

14-bit up counter 136 includes an on-board oscillator. Resistor 134, capacitor 133, and resistor 135 control the clock rate of the oscillator within up counter 136. The output of the edge detector circuitry (output received from Schmidt trigger gate 108) is gated through switch 131 (switches 131, 120 and 130 are further described below) and onto the reset input of up counter 136. Every successfully detected rising edge of the watchdog input 101 will reset up counter 136 to zero. If the interval between rising edges becomes too long, up counter 136 will overflow, and the watchdog input is considered to have failed. The high state of the overflow bit causes a number of things to happen. First, transistor 119 is turned off via Schmidt trigger gate 111, resistor 112, and Schmidt trigger gate 113. Second, the internal clock in up counter 136 is halted by grounding its P1 input through switch 130. This has the effect of holding the fault condition. Third, the rising edge of the overflow bit is detected by resistor 128 and capacitor 129, clamped positive by diode 127, converted back to a TTL signal by Schmidt trigger gates 126 and 125, and used to clear the up/down counter, or pulse counter 121. Fourth, the overflow bit switches the output of the edge detector circuit noted above via switch 120 onto the UP input of the up/down counter 121.

Pulse counter, or up/down counter 121 is a four bit up/down counter with preset and clear functionality. In circuit 100, it is employed as a three bit up counter. The purpose of up counter 121 is to prevent single watchdog input pulses or other transient behavior from resetting counter 136. Counter 121 does reset the up counter 136 if the edge detector circuitry can successfully detect a plurality (e.g., 4) of rising edges on the watchdog input 101. The rising edge of the overflow bit in the up counter 136 clears the pulse counter 121. This turns off switch 131, disallowing pulses into up counter 136. At the same time, the overflow bit has gated the output of the edge detector circuitry onto the UP input of counter 121 via switch 120. After the fourth successfully detected edge, the overflow bit of counter 121 goes high, enabling the fifth pulse to reach the reset input of up counter 136 via switch 131. When the fifth pulse arrives, the up counter 136 will be reset, clearing its overflow bit and halting the counter 121 by shutting off switch 120. Counter 121 will hold its count indefinitely until the up counter 136 overflows again.

Switches 120, 130, and 131 are quad, CMOS bilateral switches. Gates A, B and C are used, while gate D (not shown) is unused. A and B are switch contacts, while C is the switch control. A logic high on pin C connects pins A and B. Current can flow in either direction between A and B when they are connected. Switch 130 is used to halt the up counter 136 when the overflow bit goes high. The only way the overflow bit can go high is when the time interval between the rising edges of the watchdog input gets too long. The circuit needs a way to hold this condition once it occurs. Halting the counter 136 by grounding out the oscillator input is achieved by turning on switch 130. Switch 131 is used to prevent incoming watchdog pulses from resetting the up counter 136 and clearing the overflow bit. Again, if the overflow bit is allowed to clear (go to logic low) it will release the fault condition and allow equipment 203 to turn back on. Switch 131 is turned on by the third bit of reset counter 121. Counter 121 is normally frozen with its overflow bit high, turning switch 131 on. In the case of a fault, the reset counter 121 clears, turning off switch 131. Switch 120 is used to halt the reset counter 121, freezing its overflow bit high. If a fault condition occurs, switch 120 is turned on, allowing the watchdog inputs to be received into the counter 121.

The panic input 160 allows the computer to rapidly shut off relays 149-152 in case of an event detected by the computer, as determined by the system designer. The TTL input 160 turns on n-channel FET 162 via resistor 161. This action forces a low input on gate 113 which in turn shuts off transistor 119.

Resistor 112, and capacitor 116 hold a low input on Schmidt trigger gate 113 for an amount of time even if the output of Schmidt trigger gate 111 goes high. This holds switch 119 off during power up and any transients that would cause it to come on, including release of the panic input 160 and clearing of the overflow bit in up counter 136. The goal is to prevent glitching on the outputs of the relays 149-152. However, diode 114 insures that if the overflow bit of up counter 136 goes high, switch 119 will shut off immediately. LED 115 and resistor 117 provide an indication of a time out condition. Resistors 118, 122-124, and 132 are biasing resistors.

An alternative embodiment of the watchdog safety card can include a hardware timed sequence of shutdown signals to allow safe shutdown of multiple pieces of equipment in an orderly fashion when a hardware or software abort signal is issued.

An alternative embodiment of the watchdog safety card can include multiple priority shutdown levels which allow the computer to signal a particular level of shutdown severity appropriate for a particular set of conditions. This could be coded as multiple output bits indicating the severity level. A particular piece of equipment could thus be programmed to only shutdown in the event of a very severe condition while other equipment could be shutdown even for a minor fault condition.

FIG. 2 illustrates system 200, which is one embodiment for utilizing the watchdog safety card, or circuit 100, for monitoring and controlling equipment. System 200 shows four separate subsystems, but could be comprised of any number of subsystems. Each subsystem comprises a computer 201a . . . 201d running a control program. Each computer 201a . . . 201d has a dedicated watchdog safety card 100a . . .

100d, as similarly described above with respect to FIG. 1. Each watchdog safety card 100a . . . 100d will have watchdog input 101a . . . 101d, and panic input 160a . . . 160d, with outputs watchdog fail 140a . . . 140d, first power signal 149a . . . 149d, second power signal 150a . . . 150d, third power signal 151a . . . 151d, and control power signal 152a . . . 152d. The watchdog input signal 101a . . . 101d and the panic signal 160a . . . 160d are received by the watchdog safety circuits 100a . . . 100d, respectively, from computers 201a . . . 201d, respectively. Each watchdog safety circuit 100a . . . 100d may output to its respective computer 201a . . . 201d, the watchdog fail signal 140a . . . 140d.

As discussed briefly above, circuit 100 monitors three input signals. The first input signal is the interlock input received by transceiver 141, which may be an optical fiber signal that acts as an enable input. If the interlock is incomplete (or low), relays 149-151 will open while relay 152 is unaffected. In such a system, the interlock input may monitor the status of a master interlock switch. This switch might indicate the summary status of all local hardware interlocks, including for example, an interlock on a door to an equipment room. Referring to FIG. 2, such a door is illustrated as door 206 connected to interlock switch 205a. Interlock switch 205a has its signal driven to watchdog safety card 100a by fiber optic driver 204a, where the interlock input 141a is received. Note that interlock switch 205a can be replaced by any desired electronics as long as the electronics are capable of enabling and interrupting the output of fiber optic driver 204a. In the event the fiber connecting fiber optic driver 204a to interlock input 141a is broken or otherwise interrupted, circuit 100 will behave as if interlock switch 205a has opened, and relays 149-151 will open.

Other interlock switches 205b . . . 205d may be coupled to other critical portions of system 200, with the status of switches 205b . . . 205d indicated by fiber optic signals which may be driven by fiber driver circuits 204b . . . 204d to the interlock inputs 141b . . . 141d of safety circuits 100b . . . 100d. Opening of the interlock switch 205b . . . 205d, or any logic condition which turns off fiber optic driver 204b . . . 204d, will cause relays 149-151 of the associated watchdog safety card to open.

Each computer 201a . . . 201d in system 200 has a dedicated safety card 100a . . . 100d. Operation of system 200 requires interaction between control software running on each individual or local computer 201a . . . 201d and the safety cards 100a . . . 100d. The software language of the control software is immaterial, as long as it can communicate with some type of input/output card or port. A requirement imposed on the input/output card or port is that it have a sufficiently rapid response to switch a logic output twice within a selected timeout interval.

For the purposes of this application, "alternating state telemetry" is defined as any time-varying analog or digital waveform produced at a computer output card or port with sufficient range of variation in voltage, current, or other property to reliably transmit ON/OFF state changes indicative of software activity on the part of the computer. Examples of this include TTL output produced by a digital input/output (DIO) card, the output of an RS-232 serial communications port, and software controlled a periodic analog waveform output produced with an analog output card.

For the purposes of this application, "high-speed alternating state telemetry" is defined as alternating state telemetry with a guaranteed maximum ON-OFF-ON transition interval, which is less than the minimum desired watchdog-safety-card hardware-selected timeout interval. Examples of this include a square-wave TTL output with a frequency higher than the reciprocal of the desired timeout interval, and an analog waveform output with frequency swept randomly between 2 and 10 times the reciprocal of the desired timeout interval.

For simplicity, the high-speed alternating state telemetry may be produced by a DIO card in the computer, said card used to generate a TTL output. This output is sent out as watchdog input 101a . . . 101d. Each local computer 201a . . . 201d will also have custom control software written to control whatever equipment 203a . . . 203d is associated with the computer. In order for the watchdog safety card 100a . . . 100d to monitor the status of its respective computer 201a . . . 201d and its control software, the software includes a loop structure to actively toggle the output state of a strobe output bit on the DIO card installed in the computer.

Figure 4:
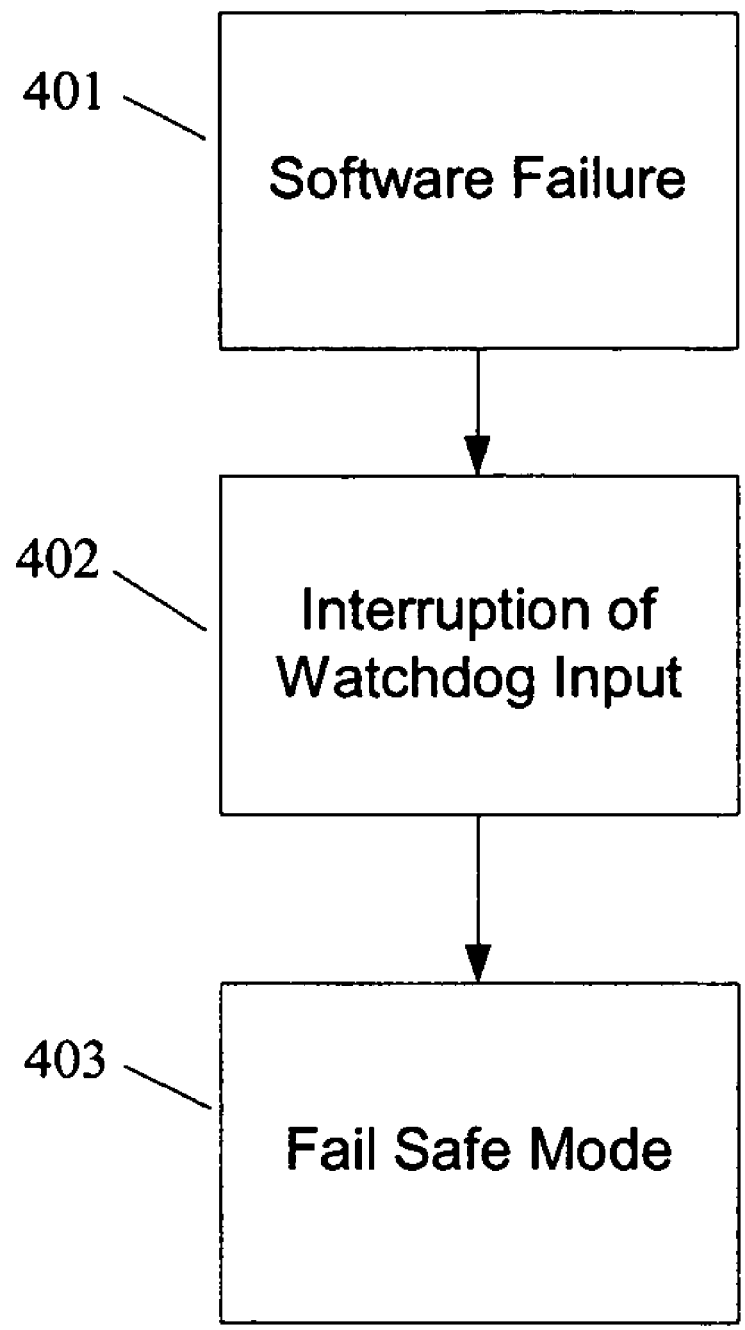
FIG. 4 illustrates a response of the safety system of FIG. 2 in the event of a software failure.

This strobe output bit is then connected electrically by cable to the watchdog input 101 of the safety circuit 100. The toggling of the strobe output bit 306 is generated in a software loop that is also responsible for all other critical hardware control of equipment 203a . . . 203d (step 302). This ensures that the toggling of the strobe output bit 306 is indicative of the health of this critical software. The software will invert the polarity of the strobe output bit 306 at each iteration of the loop (step 301). Referring to FIG. 4, if this loop fails to execute at least twice within a hardware-selected timeout interval, a problem with either the computer hardware or software has occurred (step 401) and the safety card 100a . . . 100d will initiate a local hardware abort in accordance with the process described above. The loop execution time and/or watchdog timeout interval is adjusted to ensure at least two strobe transitions per timeout interval. As a result, circuit 100a . . . 100d is able to monitor through the receipt of the watchdog input signal 101a . . . 101d (step 402) the operation of the software controlling the equipment 203a . . . 203d and the operation of the computer 201a . . . 201d, so that it can initiate a local shutdown of power (step 403) to the equipment 203a . . . 203d if there is a problem with any of the controlling software or computer.

Control software running on computer 201a . . . 201d will also monitor the watchdog fail output signal 140a . . . 140d via DIO bit 307 (step 303 of FIG. 3) and perform appropriate and predetermined software operations (step 304) consistent with a local hardware failure or interlock opening. System 200 may include an arbitrary number of distributed computers 201a . . . 201d simultaneously operating each of their respective subsystems, such as shown in FIG. 2. Such computers 201a . . . 201d may be linked by a computer network, which may be an Ethernet network including a hub or switch 202. A gigabit fiber Ethernet network may be utilized for high bandwidth and electrical isolation. One of the computers 201d may be selected, for example, by an entry in a configuration file, to run a network data server capable of maintaining a plurality of variables accessible over the network. This data server may use Transmission Control Protocol TCP to host or provide for an arbitrary number of named variables to contain status information.

Figure 5:
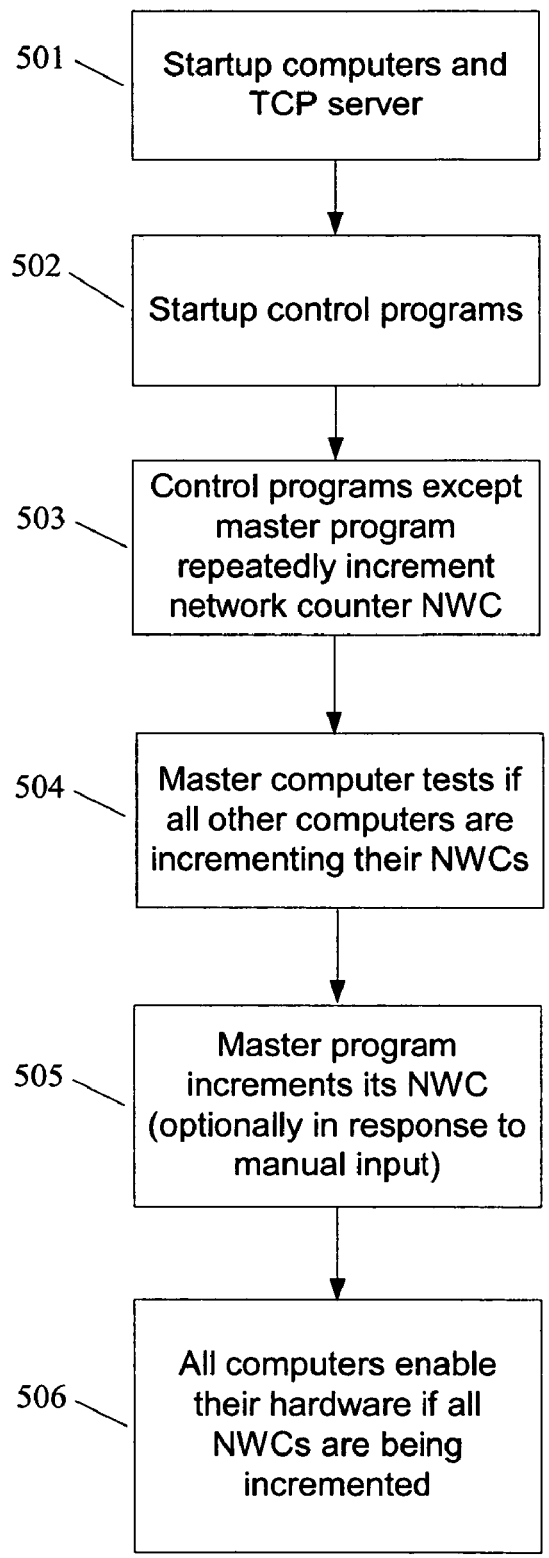
FIG. 5 illustrates an initial startup of the software of the safety system of FIG. 2.

Each computer in the control network owns a special variable on the TCP server which is associated with that particular computer and may have the same name as the network name of that computer. This variable, which may be an unsigned integer, is referred to as the network watchdog counter (NWC). It provides a network-wide accessible location to indicate proper functioning of that particular computer's control software. Referring to FIG. 5, when the system 200 is initially started, the TCP server 201d starts first (step 501) followed by the individual control programs in any sequence (step 502). Each control program, except a designated master control program, will begin incrementing its NWC (step 503), but will not enable its local hardware until it detects that all other NWC's are being incremented (step 504). The master program contains a system enable button which may have to be pressed by a human operator. Once all control programs have been started and are detected by the master program, the master program allows the operator to press the system enable button. Alternatively, system enable may be initiated automatically. When that button is in the enable position, the master program will then begin updating its NWC (step 505). This effectively signals all the computers to enable their hardware and commence periodic testing of all NWCs (step 506).

Figure 3:
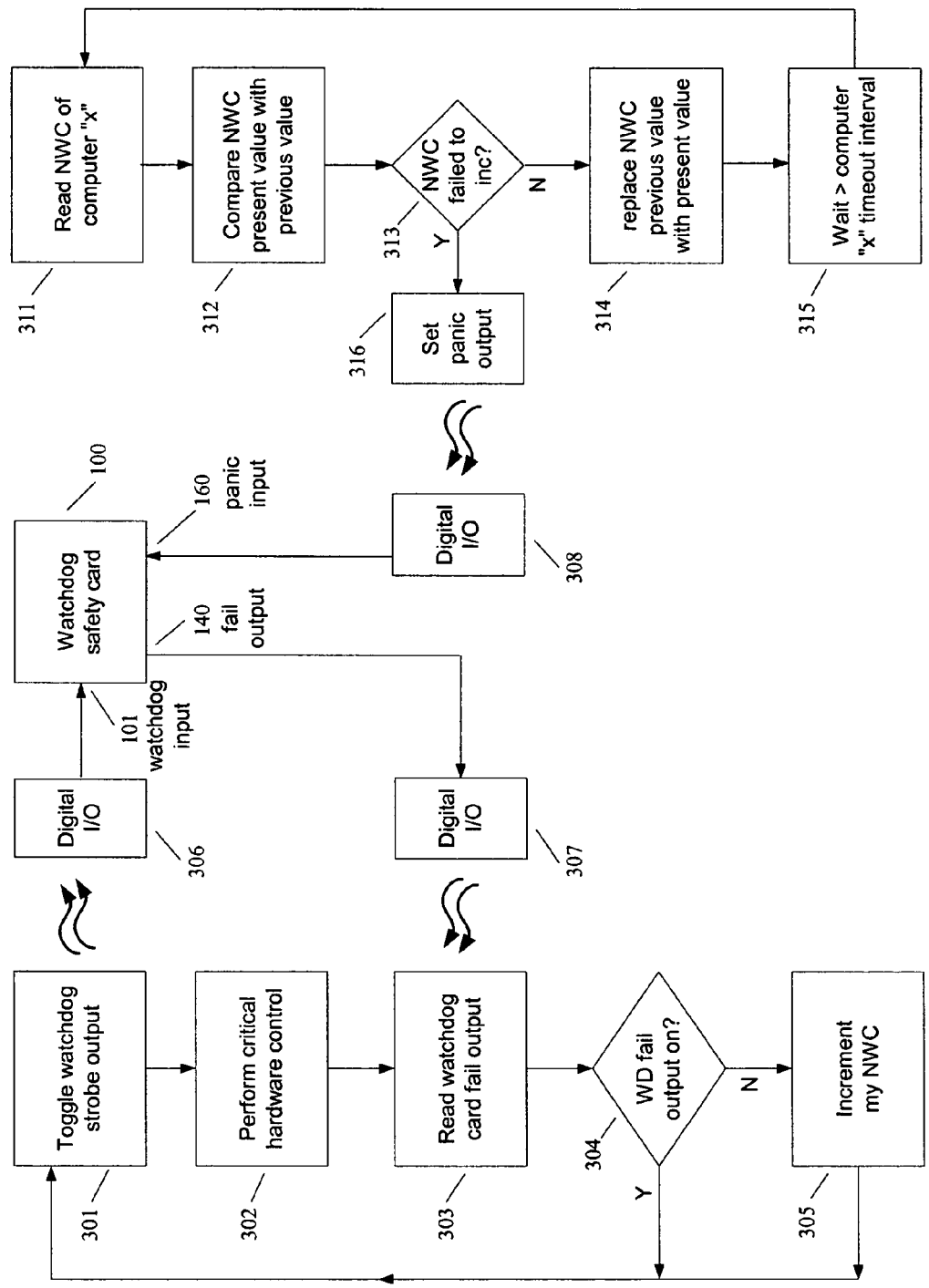
FIG. 3 illustrates the control logic of the software portion of the safety system of FIG. 2.

Control software on each computer 201a . . . 201d will increment its NWC during each iteration of its control loop at the same point as it toggles its strobe output signal to the watchdog input 1011a . . . 101d (see FIG. 3 step 305). Simultaneously, but optionally in separate parallel loops, each computer 201a . . . 201d monitors the NWC of all other computers in the network to ensure all computers are functioning properly. One such parallel loop is shown in FIG. 3 in which the NWC of one of the other computers, computer "x," is read from the TCP server in step 311. Each computer maintains a local copy of its own NWC as well as the most recent NWC of all other computers (step 314). Testing for a change of the NWC of all other computers (step 312) occurs on time intervals specified for each computer in the configuration file which should be substantially equal to the hardware timeout intervals set for those same computers (step 315). Referring to FIG. 3, in the event a watchdog safety card 100a . . . 100d of a local computer brings its watchdog fail output 140a . . . 140d high, indicating a failure mode on any of the three inputs (step 303), the control software of that computer 201a . . . 201d will cease to update its NWC (step 304). This indicates to other computers in the network 200 that the local computer 201a . . . 201d has encountered a fail condition.

When all other computers detect a particular computer's failure to increment its NWC (step 313), they will place their local hardware into safe mode awaiting an operator reset. For example, each computer 201a . . . 201d will ensure that the panic input signal 160a . . . 160d indicates a failure mode via DIO bit 308 (step 316) to the watchdog safety card 100a . . . 100d, resulting in a shutdown of the power to equipment 203a . . . 203d. The hardware equipment 203a . . . 203d attached to the computer that has "hung" is placed in safe mode by its watchdog safety card 100a . . . 100d.

In an alternative embodiment, an additional network accessible Boolean variable associated with each computer would indicate the status of that computer's watchdog safety card. Each computer would copy the status of its watchdog fail output 140a . . . 140d to its network accessible Boolean variable each iteration of its control loop. In this embodiment, each computer would continue to update its NWC in the event of a local hardware failure which would allow each computer to detect external hardware failures in other computers in the absence of computer or software failures.

More rapid active signaling of a panic shutdown can be implemented by using millisecond response network messaging to emulate the function of the hardware panic input rather than just monitoring the NWCs and waiting for the respective watchdog timeout intervals.

Note that if the network connection to any computer fails, it will neither be able to update its NWC or read other NWCs. In this event, the computer 201a . . . 201d with the failed network connection will set its DIO output connected to the panic input 160a . . . 160d of its safety card 100a . . . 100d to shut down all local equipment 203a . . . 203d. Each of the other computers will detect the lack of an NWC update by the computer with the failed network connection after its specified time out interval (steps 311 through 315). At this point, these computers will set their own panic signals to shut down their local hardware (step 316). In the event the TCP server fails to operate correctly, each computer on the network will detect the inability to read the various NWCs (steps 311 and 313) and also enter a local shutdown mode through the panic signal 160a . . . 160d (step 316).

If the master program detects any fault, including the failure of any NWC to increment, it will disable its watchdog safety card 100a . . . 100d, stop updating its NWC, and trip and latch the system enable button. Operator action is again required to reset the system.

In an alternative embodiment, the control software on the distributed computers can process and synthesize information from sensors on multiple computers to detect a potentially hazardous situation not apparent from a single computer's sensors. This synthesized data can be used to abort the entire system or selected portions of the system.

Although the present invention and its advantages have been described in detail, it should be understood that various changes, substitutions and alterations can be made herein without departing from the spirit and scope of the invention as defined by the appended claims.

What is claimed is:

1. A safety circuit for monitoring and controlling power to an equipment operated by a computer executing control software to cause said equipment to "fail safe" in the event of a safety alert, said safety circuit comprising:
   a detector circuit for receiving an alternating state telemetry signal from said computer, wherein said alternating state telemetry signal indicates a satisfactory operation of said computer and said control software;
   a relay circuit for applying power to said equipment;
   a first counter, coupled to said detector circuit, for outputting a first alert signal to said first relay circuit in response to an interruption in said alternating state telemetry signal received by said detector circuit;
   a second counter for outputting a reset signal to cancel said first alert signal in response to a resumption of said alternating state telemetry signal being received by said detector circuit in less than a predetermined timeout period after said interruption, thereby preventing said safety circuit from removing power from said equipment; and
   a switching circuit, coupled to said detector circuit, for switching said relay circuit to remove power from said equipment in response to said interruption lasted longer than said predetermined timeout interval.

2. The safety circuit of claim 1, wherein said switching circuit also removes power from said computer when said interruption said interruption lasted longer than said predetermined timeout interval.

3. The safety circuit of claim 1, wherein said safety circuit further includes an interlock circuit for sensing a signal indicative of the status of an interlock and for outputting a second alert signal in response to said interlock circuit sensing said interlock being opened such that said relay circuit, in response to said second alert signal, removes power from said equipment.

4. A safety circuit for monitoring and controlling the power to equipment operated by a computer executing control software to cause said equipment to "fail safe" in the event of an alert signal, said safety circuit comprising:
   a detector circuit for detecting an alternating state telemetry signal from said computer, wherein said alternating state telemetry signal indicates satisfactory operations of said computer and said control software;

a first counter, coupled to said detector circuit, for outputting an alert signal in response to an interruption in said alternating state telemetry signal received by said detector circuit;

a second counter, coupled to said detector circuit and said first counter, for outputting a reset signal to cancel said alert signal in response to a resumption of said alternating state telemetry signal being received by said detector circuit in less than a predetermined timeout period after said interruption, thereby preventing said safety circuit from removing power from said equipment;

a relay circuit for applying power to the equipment; and a switching circuit, coupled to said first counter, for receiving said alert signal, wherein said switching circuit is capable of switching said relay circuit to remove power from said equipment in response to said alert signal.

* * * * *